United States Patent [19]

Keller et al.

[11] Patent Number: 5,272,237

[45] Date of Patent: Dec. 21, 1993

[54] CARBORANE-(SILOXANE OR SILANE)-UNSATURATED HYDROCARBON BASED POLYMERS

[75] Inventors: Teddy M. Keller; Leslie J. Henderson, both of Alexandria, Va.

[73] Assignee: The United States of America as represented by the Secretary of the Navy, Washington, D.C.

[21] Appl. No.: 983,194

[22] Filed: Nov. 30, 1992

[51] Int. Cl.[5] .................................. C08G 77/56
[52] U.S. Cl. ........................... 528/5; 528/25; 528/33
[58] Field of Search ............................ 528/5, 25, 33

[56] References Cited

U.S. PATENT DOCUMENTS

| | | | |
|---|---|---|---|
| 3,234,288 | 2/1966 | D'Alello | 260/606.5 |
| 3,397,221 | 8/1968 | Papetti et al. | 260/448.2 |
| 3,457,222 | 7/1969 | Papetti et al. | 260/46.5 |
| 3,457,223 | 7/1969 | Papetti et al. | 260/46.5 |
| 3,542,730 | 11/1970 | Papetti et al. | 260/46.5 |
| 3,661,847 | 5/1972 | Chapman et al. | 260/46.5 E |
| 3,733,298 | 5/1973 | Knollmueller et al. | 260/46.5 E |
| 4,145,504 | 3/1979 | Hedaya et al. | 528/5 |
| 4,208,492 | 6/1980 | Hedaya et al. | 525/389 |
| 4,235,987 | 11/1980 | Peters | 528/5 |
| 4,269,757 | 5/1981 | Mine et al. | 260/37.5 B |
| 4,857,490 | 8/1989 | Johnson | 501/96 |
| 4,946,919 | 8/1990 | Johnson | 526/285 |

OTHER PUBLICATIONS

*Inorganic and Organo Metallic Polymers,* M. Zeldin et al., (Eds.), Amer. Chem. Soc. Wash. DC (1988) at pp. 44,90.
*Efficient "One-Pot", Synthesis of Silylene-Acetylene and Disilylene-Acetylene Preceramic Polymers from Trichloro Ethylene,* I Jade-Magksoo D. I. et al., J. of Polymer Science: Part A vol. 28, 955 (1990) at pp. 958.
*Ceramics via Polymer Pyrolysis,* K. J. Wynne et al., 14 Ann. Rev. Mat. Sci. 297 (1984).
*High Temperature Siloxane Elastomers,* P. Dvornic et al., Huthig & WEPF Verlag Basel, NY (1990), at pp. 277, 282.
*Poly(Dodecacarborane-Siloxanes),* E. Peters, J. Macromol. Sci-Rev. Macromol. Chem., C17(2), (1979), at pp. 190-199.
*Synthesis and Study of Silylene-Diacetylene Polymers,* Maghsoodi et al., 23 Macromolfcules (1990) at p. 4486.
*d-Orbital Effects in Silicon Substituted Ty-Electron Systems, Part XII, Some Spectroscopic Properties of Alkyl and Silyl Acetylenes and Polyacetylenes,* H. Bock et al., J. Chem. Soc. (B), (1968) at p. 1159.
*Silylatin as a Protecine Method for Terminal Alkynes in Oxidative Couplings-A General Scheme of the Parent Polyvnes,* Eastmond et al., 28 Tetrahedron 4601 (1972).
*A New Series of Oreano Boranes, VI, The Synthesis and Reactions of Some Silyl Neocarboranes,* Papetti et al., 3 Inorg. Chem. 1448 (1964) at 1449.
*A New Series of Organo Boranes, VII The Preparation of Poly-m-Carboranylenesiloxanes,* Papetti et al., 4 J. of Polymer Sci.: Part A-1, 1623 (1966) at p. 1630.
*Icosamedral Carboranes XV, Monomeric Carboranylene Siloxanes,* Scott et al., 9 Inorg. Chem. 2597 (1970) at pp. 2599.

*Primary Examiner*—Melvyn I. Marquis
*Attorney, Agent, or Firm*—Thomas E. McDonnell; Barry A. Edelberg

[57] ABSTRACT

This invention relates to a new class of novel linear inorganicorganic hybrid polymers of varying molecular weight that are useful for making high temperature, oxidatively stable thermosets, and these novel linear polymers are in themselves oxidatively stable at high temperatures between 600°-1000° C. These new materials have repeat units that contain at least one alkynyl group and at least one bis(silyl or siloxanyl)carboranyl group within the backbone of these novel linear polymers. These novel linear polymers can be further polymerized to form thermosets and ceramics.

20 Claims, 1 Drawing Sheet

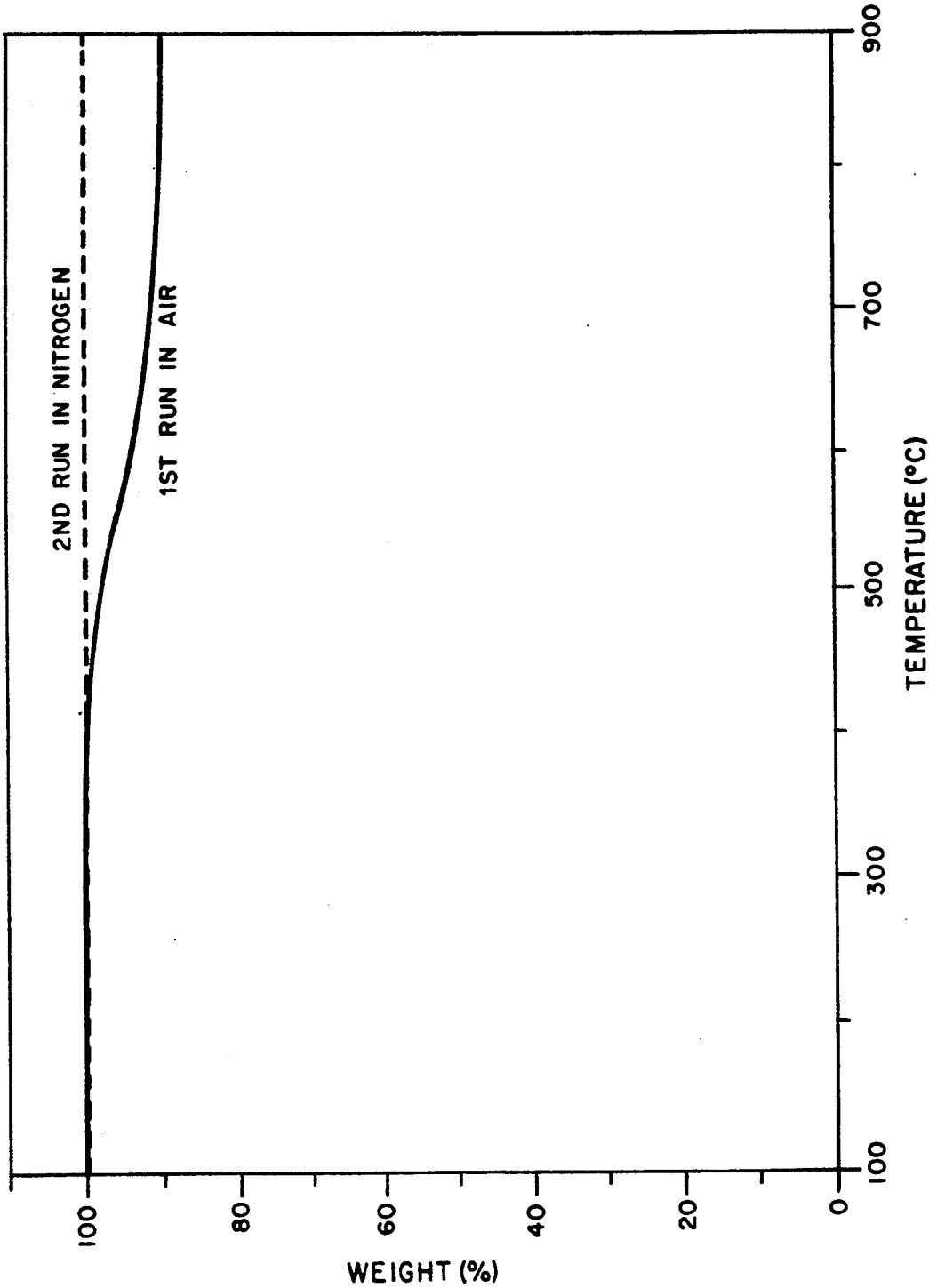

CARBORANE-(SILOXANE OR SILANE)-UNSATURATED HYDROCARBON BASED POLYMERS

BACKGROUND OF THE INVENTION

1. Field of the Invention

The present invention generally relates to an organoboron polymer containing a carboranyl group, silyl or siloxanyl groups and alkynyl groups within the backbone of the organoboron polymer. These bis(silyl or siloxanyl)carboranyl alkynyl polymers of varying molecular weight are useful for making further thermosetting polymers and ceramics and are in themselves oxidatively stable at high temperatures.

2. Description of the Related Art

The recent literature reflects continuing major research efforts to advance fundamental knowledge in high temperature material design. See K. J. Wynne and R. W. Rice, *Ceramics Via Polymer Pyrolysis* 14 ANN. REV. NAT. SCI. 297 (1984).

In the search for high temperature oxidatively stable materials considerable attention has been given to polymers containing boron within the polymer. It has been known that the addition of a carborane within a siloxane polymer significantly increases the thermal stability of such siloxane polymers. Therefore, polymers having the following general formula have been manufactured:

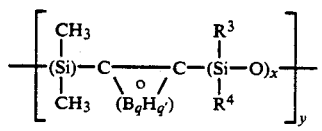

where x and y are positive integers, q and q' are integers from 3 to 16, $CB_qH_{q'}C$ is a carboranyl group, and $R^3$ and $R^4$ are saturated, unsaturated, or substituted hydrocarbons. Whenever applicable, note that both representations, $CB_qH_{q'}C$ and

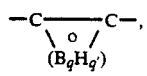

are used to represent either the ortho, meta or para isomers of the respective carboranyl moieties. Other similar manufactured polymers are polymers having the general formula:

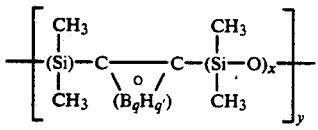

or

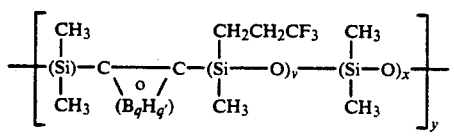

where y is a positive integer, x is a positive integer greater than or equal to 0 ($x \geq 0$), v is a positive integer greater than 0 ($v > 0$, or $v \geq 1$), and q and q' are integers from 3 to 16. When $q = q' = 10$, these polymers are commonly referred to as $D_x$ or $D_{x+v} - F_{v+1}$, respectively. Another polymer among this class has the formula:

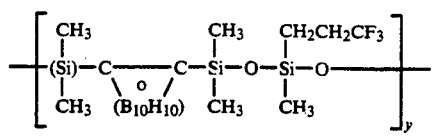

referred to as $D_2$-$F_1$. The thermal properties of these polymers are given by PETAR DVORNIC ET AL. in HIGH TEMPERATURE SILOXANE ELASTOMERS published by Huthig & Wepf Verlag Basel, New York (1990) on pp. 277 in FIG. 5.7 and on pp.282 in FIG. 5.12 and by Edward N. Peters in *Poly(dodecacarborane-siloxanes)* published in J. MACROMOL. SCI.-REV. MACROMOL. CHEM., C17(2) on pp. 190–199 in FIGS. 3,4,5,6,7,10 and 12. It is evident from these figures that the aforementioned polymers lose more than 15-20% of their weight when heated, in an oxidative environment, above 600° C.

Other polymers that have been manufactured have the following formula:

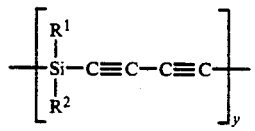

where $R^1 = R^2 = Me$, or $R^1 = R^2 Ph$, or $R^2 = Ph$ and $R^2 = Me$ and where y is a positive integer. These polymers also show a weight loss in excess of 15-20% in an inert atmosphere when heated between 600°-1000° C. Greater weight loss is expected in an oxidative atmosphere when heated to the 600°-1000° C. range. See Table II of Maghsoodi et al. in *Synthesis and Study of SilyleneDiacetylene Polymers* published in 23 MACROMILECULES pp. 4486 (1990).

There are very few carborane-siloxane or carborane-silane polymers that show high temperature stability (weight loss <15-20%) in an oxidative environment. Many of the carborane polymers manufactured are cited in various U.S. patents. Bee, for instance, the following commonly assigned U.S. Pat. Nos.: 4,946,919; 4,269,757; 4,235,987; 4,208,492; 4,145,504; 3,661,847; 3,542,730; 3,457,222; and 3,234,288. While the examples of carborane-silane or carborane-siloxane polymers cited are not all inclusive, a majority of the polymers cited exhibit a weight loss greater than 15-20% in an oxidative environment when heated above 600° C. There is an established need for carborane-silane or carborane-siloxane polymeric materials that show high temperature stability where weight percentage loss is limited to 20% or less when heated in excess of 600° C. in an oxidative environment.

In addition, a majority of the carborane-siloxane or carborane-silane or alkynyl-silane or alkynyl-siloxane polymers made by others show elastomeric properties rather than properties of more rigid polymeric products like thermosetting polymers or ceramics. Thus, in addition to thermal stability, there is also a need for polymers that behave more as thermosets and ceramics, upon further polymerization, and less like elastomeric polymers.

SUMMARY OF THE INVENTION

It is therefore an object of the present invention to provide linear carborane-silane-alkynyl or carborane-siloxanealkynyl polymers that show less than 20% weight loss, in an oxidative environment, when heated to temperatures between 600°–1000° C.

It is another object of the present invention to provide linear carborane-silane-alkynyl or carborane-siloxane-alkynyl polymers which can be readily converted into high temperature thermosetting polymers or thermosets, upon further polymerization, rather than remain as elastomers, between 200°–1000° C.

It is another object of the present invention to provide linear carborane-silane-alkynyl or carborane-siloxane-alkynyl polymers that have sufficiently low viscosities to readily fill complex dies for making components therefrom.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein:

FIG. 1 is a thermogravimetric analytical (TGA) plot of weight % versus temperature in an oxidizing environment (air) on the first heating cycle and, subsequently, on the second heating cycle in nitrogen for the polymer poly(butadiyne-1,7-bis(tetramethyldisiloxanyl)-closo-dodeca-meta-carborane having the formula:

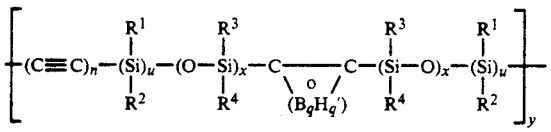

where n=2, q=q'=10, u=x=1, $R^1=R^2=R^3=R^4=CH_3$, and y≈11 (MW≈4900).

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to a new class of novel linear inorganic-organic hybrid polymers of varying molecular weight having the general formula:

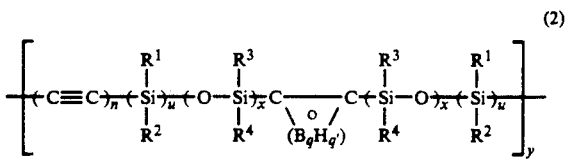

(2)

where:

(1) n is an integer from 1 to 12 and u and y are positive integers;

(2) —(C≡C)$_n$— represents an unconjugated acetylenic moiety or a conjugated acetylenic moiety when n is an integer greater than 1;

(3) $R^1$, $R^2$, $R^3$ and $R^4$ represent hydrocarbon moieties or halo-substituted hydrocarbon moieties (4)

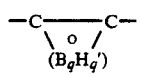

represents said carboranyl group; and (5) q and q' are integers from 3 to 16;

(6) x represents an integer greater than or equal to zero (x≧0).

The novel linear inorganic-organic hybrid polymers (2) with repeating units containing at least one alkynyl or acetylenic group and at least one bis(silyl or siloxanyl)-carboranyl group are designed to take advantage of the thermo-oxidative stability of inorganics and the processability of organics. While poly(carborane-siloxane) elastomers, silylene-acetylene and silylene-diacetylene polymers have been reported, polymers (2) containing both the carboranyl and acetylenic moieties have not been previously reported.

The general chemical scheme for synthesizing these novel linear polymers (2) is represented by the exemplary synthesis of (2') given below:

(step 1)

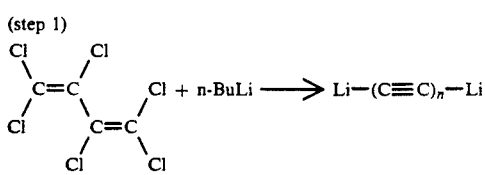

(step 2)

-continued

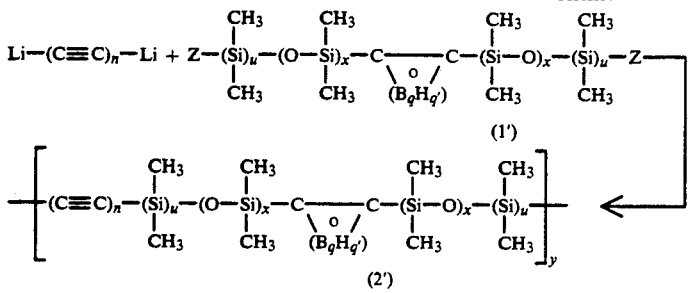

(1')

$$\left[-(C\equiv C)_n-(Si)_u-(O-Si)_x-C\underset{(B_qH_{q'})}{\overset{O}{\diagdown\diagup}}C-(Si-O)_x-(Si)_u-\right]_y$$

(2')

where:
(1) n=2, u=x=1, and y is a postive integer;
(2) —(C≡C)$_n$— represents a conjugated acetylenic moiety where n=2;
(3) R$^1$=R$^2$=R$^3$=R$^4$=CH$_3$;

(4)

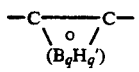

represents said carboranyl group; and (5) q=q'=10;
(6) Z is selected from the group consisting of F, Cl, Br and I;
(7) Li—(C≡C)$_n$—Li represents a dilithio salt where n=2; and
(8) n-BuLi represents n-butyllithium.

Given the general scheme, step 1 involves forming a salt, for example, the dilithio salt of butadiyne by reacting 4 equivalents of n-BuLi with hexachlorobutadiene. To form the polymer (2'), step 2 involves reacting equal molar concentrations of the dilithiobutadiyne produced in step 1 with compound (1').

It should be noted that if trichloroethylene is used in step 1 instead of hexachlorobutadiene, a salt of ethyne or acetylene is formed in step 1 where n=1. Consequently, an ethynyl moiety is incorporated into the polymer produced in stop 2 where n=1. By using hexachlorobutadiene in stop 1, the salt of butadiyne is formed where n=2. In turn, a butadiyne moiety is incorporated into polymer (2') where n=2. In order to form a polymer where n=3, a salt of hexatriyne needs to be formed in stop 1. The synthesis of the disodium salt of hexatriyne is given in the article by Bock and Seidl, d-Orbital Effects in Silicon Substituted π-Electron Systems. Part XII. Some Spectroscopic Properties of Alkyl and Silyl Acetylenes and Polyacetylenes, J. CHEM. SOC. (B), 1158 (1968) at pp. 1159. Thus, by forming the appropriate alkynyl salt, the length of the alkynyl moiety, represented by the value of n, incorporated into the polymer formed in step 2 can be controlled. Typically, the value of n can be varied from 1 to 12. Acetylenic derivatives having the general formula H(C≡C)$_n$H can be readily converted into the dilithio salts by reacting with n-butyllithium. The respective dilithio salts, with values of n varying from 1 to 12, can then be incorporated into the backbone of polymers (2) as shown in the aforementioned stop 2. The value of n can be varied, typically, from 1 to 12, more often from 1 to 10 and 1 to 8, most often from 1 to 6 and, in particular, from 1 to 3 and 1 to 2. Acetylenic derivatives having the general formula H(C≡C)$_n$H can be readily formed by the synthesis given by Eastmond et al. in Silylation as a Protective Method for Terminal Alkynes in oxidative couplings—A General Synthesis of the Parent Polyynes; 28 TETRAHEDRON 4601 (1972).

Furthermore, a variety of compounds can be produced that have structures similar to that of compound (1') shown in step 1. One variation includes replacing the methyl groups attached to the Si with other hydrocarbon moieties or halo-substituted hydrocarbon moieties. Typical reactions synthesizing disubstituted dichloro silanes of varying size (varying values of u) and having different R groups are known in the art:

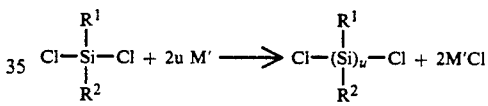

where M' is a group 1 metal or alloy. The above reaction is cited by ZELDIN ET AL. (EDITORS) in IN-ORGANIC AND ORGANOMETALLIC POLYMERS, published by American Chemical Society, Washington, DC (1988) at 44 and 90. The value of u can be varied, typically, from 1 to 1000, more often from 1 to 500 and 1 to 250, most often from 1 to 100 and 1 to 10, and, in particular, from 1 to 6. Another variation includes controlling the values of x in addition to that of u.

Synthesis of a variation of compound (1') where u=1 and x=0 and Z=Cl is given by Papetti et al. in A New series of Organoboranes. VI. The Synthesis and Reactions of Some Silyl Neocarboranes, 3 INORG. CHEM. 1448 (1964) at 1449 under the caption "C,C'-Bis(methyldichlorosilyl)neocarborane (IV)." The synthesis of compound (1') where u=1 and x=1 and Z=Cl is given by Papetti et al. in A New series of Organoboranes. VII. The Preparation of Poly-m-carboranylenesiloxanes, 4 JOURNAL OF POLYMER SCIENCE: PART A-1, 1623 (1966) at 1630 under the caption "Compound (VII)." Synthesis of a variation of compound (1') where u=1 and x=2 and Z=Cl is given by Scott et al. in Icosahedral Carboranes. XV. Monomeric Carboranylenesiloxanes, 9 INORG. CHEM. 2597 (1970) at 2599 under the caption "1,7-Bis(5-chlorohexamethyltrisiloxanyl)-m-carborane (IV)."

While leaving u=1, the value of x can be varied, typically, from 0 to 1000, more often from 0 to 500 and 0 to 250, most often from 0 to 10, and, in particular, from 0 to 2 by the following proposed reaction scheme:

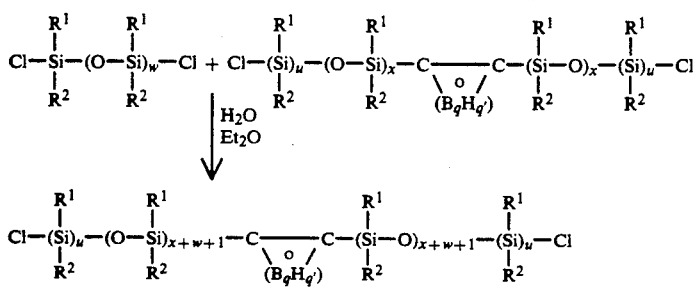

where x and w are integers greater than or equal to 0 ($x \geq 0$; $w \geq 0$) and u is a positive integer.

Following the scheme in the aforementioned steps 1 and 2, the novel linear polymers (2) can be formed by reacting a salt of an alkyne or a respective Grignard reagent with compound (1):

(step 2)

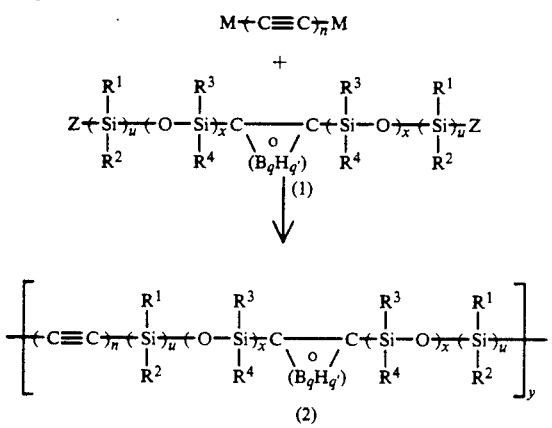

where:
(1) n is an integer from 1 to 12 and u and y are positive integers;
(2) —(C≡C)$_n$— represents an unconjugated acetylenic moiety or a conjugated acetylenic moiety when n is an integer greater than 1;
(3) $R^1$, $R^2$, $R^3$ and $R^4$ represent hydrocarbon moieties or halo-substituted hydrocarbon moieties (4)

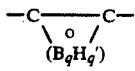

represents said carboranyl group; and (5) q and q' are integers from 3 to 16;
(6) Z is selected from the group consisting of F, Cl, Br and I;
(7) M—(C≡C)$_n$—M represents a salt of an alkyne or the respective Grignard reagent where M is selected from the group consisting of Li, Na, K and MgX' where X' is selected from the group consisting of F, Cl, Br and I; and
(8) x represents an integer greater than or equal to zero ($x \geq 0$).

These novel linear polymers (2) exhibit sufficiently low viscosities either at room temperature or at their respective melting points (mp ≈ 200° C.) to readily fill complex dies or shapes for forming parts therefrom. In addition, these polymers (2) can be further polymerized into thermosets and ceramics that form rigid shapes which are oxidatively stable at high temperatures above 600° C.

The following examples detail the synthesis of polymer (2') and related polymer (2''), polymer (2'') having the structure:

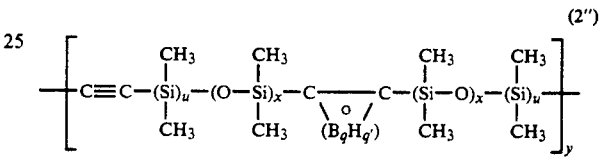

where:
(1) u = 1 and x = 0, q = q' = 10 and y is a positive integer.

EXAMPLE 1

SYNTHESIS OF POLY(BUTADIYNE-1,7-BIS(TETRAMETHYL-DISILOXANYL)-CLOSO-DODECA-META-CARBORANE) (2'):

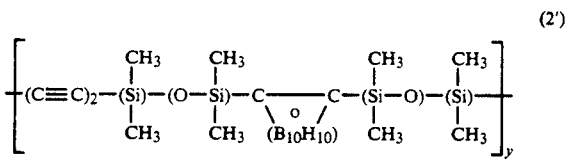

Dilthiobutadiyne was prepared by the method of IjadiMagshoodi and Barton. See S. Ijadi-Magshoodi, Y. Pang, and T. J. Barton, *Efficient, "One-Pot" Synthesis of Silylene-Acetylene and Disilylene-Acetylene Preceramic Polymers from Trichloroethylene*, 28 J. POLYM. SCI., PART A: POLYM. CHEM. 955 (1990). According to Magshoodi et al., 4 equivalents of n-BuLi in THF are cooled to −78° C. and hexachlorobutadiene is slowly added. After warming to room temperature, the dilithiobutadiyne is not isolated before use. In a typical synthesis, N-BuLi (34.2 ml, 85.5 mmol) in 12.0 ml THF was cooled to −78° C. Hexachlorobutadiene (5.58 g, 21.4 mmol) in 2.0 ml THF was added dropwise by cannula. The reaction was allowed to warm to room temperature and stirred for 2 hrs. Then dilithiobutadiyne/THF was again cooled to −78° C. To this, an equal-molar amount of the 1,7-bis (chlorotetramethyldisiloxanyl)-closo-dodeca-meta-carborane (1') (10.22 g, 21.4 mmol) in 4.0 ml THF was added dropwise by cannula. The temperature of the reaction mixture was allowed to slowly rise to ambient temperature and stirred overnight. A white solid (LiCl) was filtered off and the solvent removed by evaporation at reduced pressure leaving (2').

The polymer (2') was dissolved in ether and dried over sodium sulfate. After filtration through Celite, the ether was evaporated at reduced pressure, leaving the dark-brown viscous polymer (2'). A 97% yield (9.5 g) was obtained after drying in vacuo. Gel-permeation chromatography (GPC) indicated the presence of low molecular weight species (MW~500) as well as higher average molecular weight polymers (MW~4900). Drying under vacuum at 150° C. removed lower-weight volatiles giving a 90% overall yield. Major IR peaks (cm$^{-1}$): 2963 (C—H stretch); 2600 (B-H stretch); 2175 (C≡C stretch); 1260 (Si—CH$_3$ deformation).

EXAMPLE 2
SYNTHESIS OF POLY(ETHYN-1,7-BIS(DIMETHYLSILYL)-CLOSO-DODECA-META-CARBORANE (2"):

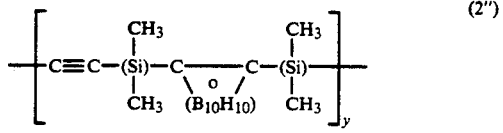

Dilithioacetylene has the formula:

and it is prepared by the method of Ijadi-Magshoodi et al. See S. Ijadi-Magshoodi, Y. Pang, and T. J. Barton 28 J. POLYM. SCI., PART A: POLYM. CHEM. 955 (1990). According to Ijadi-Magshoodi method for preparing dilithioacetylene, 3 equivalents of n-BuLi in THF are cooled to −78° C. and trichloroethylene is slowly added. After warming to room temperature, the dilithioacetylene is not isolated before use. In a typical synthesis, n-BuLi (21.6 ml, 54.0 mmol) in 10.0 ml THF was cooled to −78° C. under an argon atmosphere. Trichloroethylene (1.6 ml, 18.0 mmol) in 5.0 ml THF was added dropwise. The reaction was permitted to warm to room temperature and stirred for 14 hrs.

Compound (1") is synthesized according to the method of Papetti & Heying. See S. Papetti et al. 3 INORG CHEM 1448 (1964). The structure of compound (1") is given below:

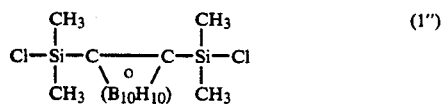

According to the method of Papetti et al., a 100 ml round bottom 3-neck flask was fitted with an addition funnel and septa, flushed with argon, and flamed. The reaction was carried out under an inert atmosphere (argon). Butyllithium (18.0 ml/2.5M in hexanes, 44.9 mmol) was cooled to −78° C. Meta-carborane (2.5902 g, 18.0 mmol) in 10 ml THF was added dropwise. A white solid (dilithiocarborane) formed and the reaction was allowed to warm to ambient temperature. After cooling the reaction mixture back to −78° C., dichlorodimethylsilane (5.5 ml, 43.5 mmol) was added dropwise. The product (1") in solution was not isolated.

To form the product (2"), the dilithioacetylene is reacted with (1"). The dilithioacetylene in THF was cooled back to −78° C. To this, (1"), as previously prepared, was added dropwise (18.0 mmol, 5.93 g) and allowed to warm to ambient temperature and stirred overnight. The solvent was removed by evaporation at reduced pressure leaving behind the dark brown polymer (2").

We claim:

1. An organoboron polymer with a backbone having a repeating unit comprising at least one carboranyl group, one acetylenic group, and one or more silyl or siloxanyl groups wherein said repeating unit is represented by the formula:

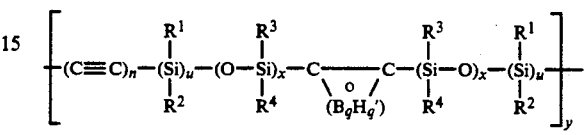

wherein:
(1) n is an integer from 1 to 12 and u and y are positive integers;
(2) —(C≡C)$_n$— represents an unconjugated acetylenic moiety or a conjugated acetylenic moiety when n is an integer greater than 1;
(3) R$^1$, R$^2$, R$^3$ and R$^4$ represent hydrocarbon moieties or halo-substituted hydrocarbon moieties;

(4)

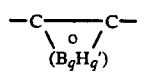

represents said carboranyl group; and (5) q and q' are integers from 3 to 16;
(6) x represents an integer greater than or equal to zero.

2. The organoboron polymer of claim 1 wherein said carboranyl group represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl and mixtures thereof.

3. The organoboron polymer of claim 1 wherein said carboranyl group represents a closo-dodecacarboranyl group selected from the group consisting of closo-dodeca-ortho-carboranyl, closo-dodeca-meta-carboranyl, closo-dodeca-paracarboranyl and mixtures thereof.

4. The organoboron of claim 1 wherein said R$^1$, said R$^2$, said R$^3$ and said R$^4$ may be the same or different and wherein each said R$^1$, said R$^2$, said R$^3$ and said R$^4$ represents a haloalkyl or haloaryl group having up to 20 carbon atoms or a hydrocarbon group having up to 20 carbon atoms and being selected from the group consisting of alkyl, aryl, alkylaryl and mixtures thereof.

5. The organoboron of claim 1 wherein said u, and said y are integers from 1 to 1000 and said x is an integer from 0 to 1000 and said n is an integer from 1 to 12.

6. The organoboron of claim 1 wherein said u, and said y are integers from 1 to 500 and said x is an integer from 0 to 500 and said n is an integer from 1 to 10.

7. The organoboron of claim 1 wherein said u, and said y are integers from 1 to 250 and said x is an integer from 0 to 250 and said n is an integer from 1 to 8.

8. The organoboron of claim 1 wherein said u, and said y are integers from 1 to 100 and said x is an integer from 0 to 100 and said n is an integer from 1 to 6.

9. The organoboron of claim 1 wherein said n is an integer from 1 to 3 and said u is an integer from 1 to 10 and said x is an integer from 0 to 10.

10. The organoboron of claim 1 wherein said n is an integer from 1 to 2 and said u is an integer from 1 to 10 and said x is an integer from 0 to 10.

11. The organoboron of claim 1 wherein said n equals 1 and said u is an integer from 1 to 6 and said x is an integer from 0 to 2.

12. A method for preparing a carborane-siloxane-acetylenic polymer or a carboranesilane-acetylenic polymer having the formula:

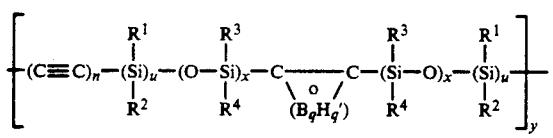

to provide said polymer wherein:

(1) $R^1$, $R^2$, $R^3$ and $R^4$ represent hydrocarbon moieties or halo-substituted hydrocarbon moieties;

(2) —$(C{\equiv}C)_n$— represents an unconjugated acetylenic moiety or a conjugated acetylenic moiety when n is greater than 1;

(3)

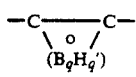

represents a carboranyl group;

(4) n is an integer from 1 to 12 and u and y are positive integers and q and q' are integers from 3 to 16; and (5) x is an integer greater than or equal to zero; comprising the step of:

reacting a salt or a Grignard agent having the formula:

wherein:

(1) M is selected from the group consisting of Li, Na, K and MgX' where X' is selected from the group consisting of F, Cl, Br and I;

(2) —$(C{\equiv}C)_n$— represents a moiety as previously indicated; and (3) n is a positive integer as previously indicated;

with a carborane-siloxane or a carborane-silane having the formula:

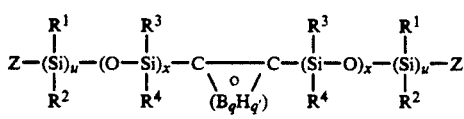

wherein:

(1) Z represents an acetyl group or a halogen atom selected from the group consisting of F, Cl, Br and I;

(2) $R^1$, $R^2$, $R^3$ and $R^4$ are as previously indicated; and (3) x, u, q and q' are integers as previously indicated.

13. The method of claim 12 wherein Z represents an acetyl group.

14. The method of claim 12 wherein said $R^1$, said $R^2$, said $R^3$ and said $R^4$ are all methyl groups or all aryl groups or mixtures thereof.

15. The method of claim 12 wherein said u, and said y are integers from 1 to 250 and said x is an integer from 0 to 250 and said n is an integer from 1 to 12.

16. The method of claim 12 wherein said u, and said y are integers from 1 to 100 and said x is an integer from 0 to 100 and said n is an integer from 1 to 10.

17. The method of claim 12 wherein said n is an integer from 1 to 6 and said u is an integer from 1 to 10 and said x is an integer from 0 to 10.

18. The method of claim 12 wherein said n is an integer from 1 to 3 and said u is an integer from 1 to 10 and said x is an integer from 0 to 10.

19. The method of claim 12 wherein said n is an integer from 1 to 2 and said u is an integer from 1 to 6 and said x is an integer from 0 to 2.

20. The method of claim 12 wherein said carboranyl group is selected from the group consisting of selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl1,6-octacarboranyl; decachloro-1,7-dodecacarboranyl; octachloro-1,10-octacarboranyl; decafluoro-1,7-dodecacarboranyl; octafluoro-1,10-octacarboranyl; closo-dodeca-orthocarboranyl; closo-dodeca-meta-carboranyl; closo-dodeca-para-carboranyl and mixtures thereof.

* * * * *